(12) United States Patent
Brockhaus et al.

(10) Patent No.: US 12,405,142 B2
(45) Date of Patent: Sep. 2, 2025

(54) MAGNETIC FIELD GENERATOR FOR A MAGNETIC-INDUCTIVE FLOWMETER, METHOD OF OPERATING THE SAME, MAGNETIC-INDUCTIVE FLOWMETER AND METHOD OF OPERATING THE SAME

(71) Applicant: KROHNE Messtechnik GmbH, Duisburg (DE)

(72) Inventors: Helmut Brockhaus, Oberhausen (DE); Markus Dabrowski, Duisburg (DE)

(*) Notice: Subject to any disclaimer, the term of this patent is extended or adjusted under 35 U.S.C. 154(b) by 325 days.

(21) Appl. No.: 18/211,794

(22) Filed: Jun. 20, 2023

(65) Prior Publication Data

US 2023/0408311 A1 Dec. 21, 2023

(30) Foreign Application Priority Data

Jun. 20, 2022 (DE) ...................... 10 2022 115 271.5

(51) Int. Cl.
   *G01F 1/58* (2006.01)
   *G01F 1/60* (2006.01)

(52) U.S. Cl.
   CPC .............. *G01F 1/586* (2013.01); *G01F 1/60* (2013.01)

(58) Field of Classification Search
   CPC ............ G01F 1/586; G01F 1/588; G01F 1/60
   See application file for complete search history.

(56) References Cited

U.S. PATENT DOCUMENTS

| | | | | | |
|---|---|---|---|---|---|
| 4,412,545 | A | * | 11/1983 | Okino | A61B 5/0265 73/861.17 |
| 4,601,209 | A | * | 7/1986 | Amata | G01F 1/586 73/861.17 |
| 6,031,740 | A | * | 2/2000 | Budmiger | G01F 1/60 363/58 |
| 9,651,411 | B2 | * | 5/2017 | Yamaguchi | G01F 1/588 |

FOREIGN PATENT DOCUMENTS

| | | |
|---|---|---|
| CN | 103206990 B | 5/2015 |
| CN | 111765931 A | 10/2020 |
| DE | 102017107417 A1 | 10/2018 |
| DE | 102020114517 A1 | 12/2021 |
| EP | 0969268 A1 | 1/2000 |
| WO | 2014001026 A1 | 1/2014 |

* cited by examiner

*Primary Examiner* — Justin N Olamit
(74) *Attorney, Agent, or Firm* — Patrick D. Duplessis

(57) ABSTRACT

A method for operating a magnetic field generator for a magnetic-inductive flowmeter is disclosed. The method involves setting, at a first reversal time, a target current value as target current and a first target voltage value as target voltage. The first target voltage value is greater than a second target voltage value, and the second target voltage value as target voltage effects the control voltage value of a current regulator voltage in a steady state of the magnetic field generator. The method further involves determining a first switching time. The current between a first reversing time and the first switching time reaches the target current value. A current regulator voltage at the first switching time is greater than a minimum voltage value and less than a control voltage value. At the first switching time, the second target voltage value is then set as the target voltage.

9 Claims, 5 Drawing Sheets

MAGNETIC FIELD GENERATOR FOR A MAGNETIC-INDUCTIVE FLOWMETER, METHOD OF OPERATING THE SAME, MAGNETIC-INDUCTIVE FLOWMETER AND METHOD OF OPERATING THE SAME

TECHNICAL FIELD

The invention relates to several items.

One item of the invention is a magnetic field generator for a magnetic-inductive flowmeter. This has a coil, a bridge circuit with at least one current regulator, a voltage regulator and a controller.

Another item is a method for operating a magnetic field generator for a magnetic-inductive flowmeter. The magnetic field generator comprises a coil, a bridge circuit having at least one current controller, a voltage regulator, and a controller.

Another item is a magnetic-inductive flowmeter. This has a measuring tube, two measuring electrodes, a magnetic field generator and a controller. The magnetic field generator has a coil, a bridge circuit with at least one current regulator and a voltage regulator. The magnetic field generator is designed to use the coil to generate a magnetic field in a medium flowing in the measuring tube, which induces a measuring voltage in the medium that can be tapped at the measuring electrodes. During operation of the magnetic-inductive flowmeter, a medium flows through the measuring tube.

Finally, another item of the invention is a method for operating a magnetic-inductive flowmeter. The magnetic-inductive flowmeter has a measuring tube, two measuring electrodes, a magnetic field generator, and a controller. The magnetic field generator has a coil, a bridge circuit with at least one current regulator and a voltage regulator. A medium is made to flow through the measuring tube.

BACKGROUND

The bridge circuit is designed to direct a current through the coil in one direction. Accordingly, the bridge circuit and the coil are interconnected. The direction of the current is either a first direction or a second direction. The first direction of the current through the coil is opposite to the second direction.

The direction can be set in the bridge circuit by the controller. The bridge circuit and the controller are designed accordingly.

The magnetic field generator includes two controllers, namely the current regulator and the voltage regulator. A controller regulates a controlled variable using feedback to a predetermined reference variable within technical limits. In an ideal case, the controlled variable is equal to the reference variable in a steady state of the controller.

The current regulator is designed to generate the current through the coil according to a target current. Accordingly, the target current is the reference variable and the current through the coil is the controlled variable. The object of the current regulator is to ensure that the current corresponds to the target current. The target current can be set in the current regulator by the controller. The current regulator and the controller are designed accordingly. The current regulator provides a current source for the coil.

For a control operation of the current regulator, a current regulator voltage present across the current regulator is greater than or equal to a control voltage value, and for a minimum operation of the current regulator, the current regulator voltage is greater than a minimum voltage value. In this case, the control voltage value is greater than the minimum voltage value. When the present current regulator voltage is greater than the minimum voltage value, the current regulator operates in minimum mode. If the present current regulator voltage is even greater than the control voltage value, then the current regulator operates in control mode. In minimum operation, an ability of the current regulator to regulate the current to the target current is limited with respect to control operation.

The voltage regulator is designed to generate a supply voltage across the bridge circuit according to a target voltage. In this regulator, the target voltage is the reference variable and the supply voltage is the controlled variable. The purpose of the regulator is to ensure that the supply voltage corresponds to the target voltage. The target voltage can be set in the voltage regulator by the controller. The controller and the voltage regulator are designed accordingly.

The voltage regulator represents a voltage source and is electrically connected in parallel to the bridge circuit.

With respect to the item of the magnetic field generator, the controller is designed to set the first direction, a target current value as target current and a first target voltage value as target voltage in a first reversal time.

With reference to the item of the method for operating a magnetic field generator, the controller sets the first direction, a target current value as target current and a first target voltage value as target voltage in a method step at a first reversal time.

With respect to the item of the magnetic-inductive flowmeter, the controller is designed to set the first direction, a target current value and a first target voltage value at a first reversal time. Further, the controller is designed to measure a first measuring voltage present between the measuring electrodes after a first switching time and before a second reversal time and to determine a flow rate of a medium through the measuring tube using the first measuring voltage.

With reference to the item of the method for operating a magnetic-inductive flowmeter, the first direction, a target current value and a first target voltage value are set by the controller in a method step at a first reversal time. In a further method step, a first measuring voltage present between the measuring electrodes is measured by the controller after a first switching time and before a second reversal time, and a flow rate of the medium is determined using the first measuring voltage, wherein the measuring voltage in the medium is caused by a magnetic field generated by the coil in the flowing medium. The magnetic-inductive flowmeter is designed to perform these method steps and also performs these method steps during operation.

At a reversal time, such as the first reversal time, the direction of the current through the coil is reversed by the bridge circuit. If before a reversal time the direction is the first direction, then after the reversal time the direction is the second direction. At the first reversal time, the first direction is set in the bridge circuit by the controller as the direction of current through the coil. Further, at a reversal time, the controller sets the target current value as the target current to the current regulator and sets the target voltage value as the target voltage to the voltage regulator. The current regulator then regulates the current to the target current value and the voltage regulator regulates the supply voltage to the first target voltage value. In this case, the first target voltage value is greater than a second target voltage value and the second target voltage value causes the control voltage value of the current regulator voltage in a steady state of the magnetic field generator.

The current through the coil generates a magnetic field. In the steady state of the magnetic field generator, the magnetic field is sufficiently constant so that, for example, measurements using the magnetic field can be performed with sufficient accuracy. With respect to the magnetic-inductive flowmeter and the method for operating a magnetic-inductive flowmeter, this means that the magnetic field induces a measuring voltage in a medium flowing through the measuring tube, this measuring voltage is measured by the controller using the two measuring electrodes, and a flow rate of the medium through the measuring tube is determined from the measuring voltage by the controller with sufficient accuracy.

It is known from the prior art that the controller sets the second target voltage value as the target voltage for the voltage regulator at a switching time such as the first switching time, which is always after a reversal time. The switching time is characterized in that the current reaches the target current value at this time. In coils used in practice, the problem arises that at the switching time a voltage across the coil does not yet have sufficient constancy. As a result, the magnetic field generated by the coil also does not yet have sufficient constancy and it is necessary to wait until the magnetic field has sufficient constancy. It has been recognized that one cause of the problem is eddy currents that arise starting at the reversal time due to the reversal of the current through the coil.

An alternative second target voltage value can be determined which is larger than the second target voltage value and usually smaller than the first target voltage value and, if set in the voltage regulator at the switching time, solves the problem described. However, it does not satisfy one criterion of the solution sought. Namely, the alternative second target voltage value causes a higher power dissipation than the second target voltage value, since it is larger than the latter. A solution that causes higher power dissipation due to a higher second target voltage value from the first switching time is not sought here.

It is also possible to determine a fixed alternative switching time that is after the previously described switching time and, if the alternative switching time is used by the controller instead of the switching time, solves the described problem. However, the alternative switching time does not fulfill another criterion of the searched solution. Namely, the fixed longer duration of setting the first target voltage causes a longer duration of higher power dissipation than when the previously described switching time is used. A solution that causes a fixed longer duration of higher power dissipation due to a switching time shifted backwards in time is not sought here. Instead, an adaptive solution is sought.

SUMMARY

The object of the present invention is to provide a specification of a solution to the problem described while satisfying the criteria described.

The object is achieved by each of the items of the invention, respectively.

Thus, the object is achieved by a method for operating a magnetic field generator having the disclosed features. Accordingly, the previously described method for operating a magnetic field generator is replaced by the modified method described below with the following method steps, which are performed by the controller:

In a first method step, the first direction, a target current value as a target current and a first target voltage value as a target voltage are set at a first reversal time, wherein the first target voltage value is greater than a second target voltage value and the second target voltage value as a target voltage causes the control voltage value of the current control voltage in a steady state of the magnetic field generator.

In a second method step, a first switching time is determined, which is characterized in that it is after the first reversal time, the current reaches the target current value between the first reversal time and the first switching time, and the current regulator voltage at the first switching time is larger than the minimum voltage value and smaller than the control voltage value, and the second target voltage value is set as the target voltage at the first switching time.

In the case of a described magnetic field generator having a coil which exhibits the previously described problem, the method, in comparison with the described prior art, causes the voltage across the coil at the switching time to have sufficient constancy so that, for example, measurements can be performed immediately using the magnetic field generated by the coil with sufficient accuracy.

Further, no increase of the second set voltage value is required when using the method. The first switching time is determined adaptively and is usually closer to the first reversal time than in the prior art described. The method is generally applicable to switching times such as the first switching time and to reversal times such as the first reversal time. The method also reduces a power consumption of the magnetic field generator.

In one design of the method for operating a magnetic field generator, the following method steps are performed by the controller following the second method step:

In a third method step, the second direction and the first target voltage value are set as the target voltage in a second reversal time.

In a fourth method step, a second switching time is determined, which is characterized in that the second switching time is after the second reversal time, the current reaches the target current value between the second reversal time and the second switching time, and the current regulator voltage at the second switching time is greater than the minimum voltage value and less than the control voltage value, and the second target voltage value is set as the target voltage at the second switching time.

These four method steps are a full cycle of the method. After that, a new cycle can begin. In one design, the first method step, the second method step, the third method step and the fourth method step are performed at least twice in this order. Thereafter, two full cycles of the method are present.

The object is also achieved by a method for operating a magnetic-inductive flowmeter having the disclosed features. Accordingly, the previously described method for operating a magnetic-inductive flowmeter is replaced by the modified method described below with the following method steps, which are performed by the controller:

In a first method step, the first direction, a target current value and a first target voltage value are set at a first reversal time, wherein the first target voltage value is greater than a second target voltage value and the second target voltage value causes the control voltage value of the current regulator voltage in a steady state of the magnetic field generator.

In a second method step, a first switching time is determined, which is characterized in that it is after the first reversal time, the current reaches the target current value between the first reversal time and the first switching time, and the current regulator voltage at the first switching time is greater than the minimum voltage value and less than the control voltage value, and the second target voltage value is set as the target voltage at the first switching time.

In a third method step, after the first switching time and before a second reversal time, a first measuring voltage present between the measuring electrodes is measured and a flow rate of the medium is determined using the first measuring voltage, wherein the measuring voltage in the medium is caused by a magnetic field generated by the coil in the flowing medium.

In one design of the method for operating a magnetic-inductive flowmeter, the following method steps are performed by the controller following the third method step:

In a fourth method step, the second direction and the first target voltage value are set as the target voltage at the second reversal time.

In a fifth method step, a second switching time is determined, which is characterized in that the second switching time is after the second reversal time, the current reaches the target current value between the second reversal time and the second switching time, and the current regulator voltage at the second switching time is greater than the minimum voltage value and less than the control voltage value, and the second target voltage value is set as the target voltage at the second switching time.

In a sixth method step, a second measuring voltage present between the measuring electrodes is measured after the second switching time, and a flow rate of the medium is determined using the first measuring voltage and the second measuring voltage, wherein the second measuring voltage in the medium is caused by a magnetic field generated by the coil in the flowing medium.

These six method steps are a full cycle of the method. Thereafter, a new cycle may begin. In a further design, the first method step, the second method step, the third method step, the fourth method step, the fifth method step and the sixth method step are performed at least twice in this order. Thereafter, two full cycles of the method are present.

The following designs concern both the method for operating a magnetic field generator and the method for operating a magnetic-inductive flowmeter.

In one of these designs, the controller iteratively determines the at least one switching time by progressively reducing a time interval between the at least one reversal time and the at least one switching time until the current regulator voltage at the at least one switching time is greater than the minimum voltage value and less than the control voltage value, preferably equal to the minimum voltage value.

In another one of these designs, the control voltage value is between 2.5 V and 3.5 V, preferably 3 V.

Finally, in yet another of these designs, the minimum voltage value is between 1.5 V and 2.5 V, preferably 2 V.

In addition to the two methods described above, the object is also achieved by the devices described below.

Thus, the object is achieved by a magnetic field generator having the disclosed features.

This is characterized in that the controller is designed to determine a first switching time, which is characterized in that it lies after the first reversal time, the current reaches the target current value between the first reversal time and the first switching time, and the current regulator voltage is greater than the minimum voltage value and less than the control voltage value at the first reversal time, and then to set the second target voltage value as the target voltage at the first switching time.

In one design of the magnetic field generator, the bridge circuit comprises a first branch comprising a current regulator and a second branch comprising a current regulator. Preferably, the current regulators are designed to be switchable by the controller.

In a further design, the controller is designed to perform one of the previously described methods for operating a magnetic field generator.

Finally, the object is also achieved by a magnetic-inductive flowmeter having the disclosed features.

This is characterized in that the controller is further designed to determine the first switching time, which is characterized in that it lies after the first reversal time, the current reaches the target current value between the first reversal time and the first switching time, and the current regulator voltage is greater than the minimum voltage value and less than the control voltage value at the first switching time, and then to set the second target voltage value as the target voltage at the first switching time.

In one design of the magnetic-inductive flowmeter, the bridge circuit of the magnetic field generator comprises a first branch comprising a current regulator and a second branch comprising a current regulator. Preferably, the current regulators are designed to be switchable by the controller.

In a further design, the controller is designed to perform any of the methods previously described for operating a magnetic-inductive flowmeter.

Notwithstanding the foregoing, the explanations regarding one item of the invention apply mutatis mutandis to the remaining items of the invention.

BRIEF DESCRIPTION OF THE DRAWINGS

In detail, a plurality of possibilities are given for designing and further developing the items of the invention. For this purpose, reference is made to the following description of a preferred embodiment in connection with the drawings.

DETAILED DESCRIPTION

Figure 1:
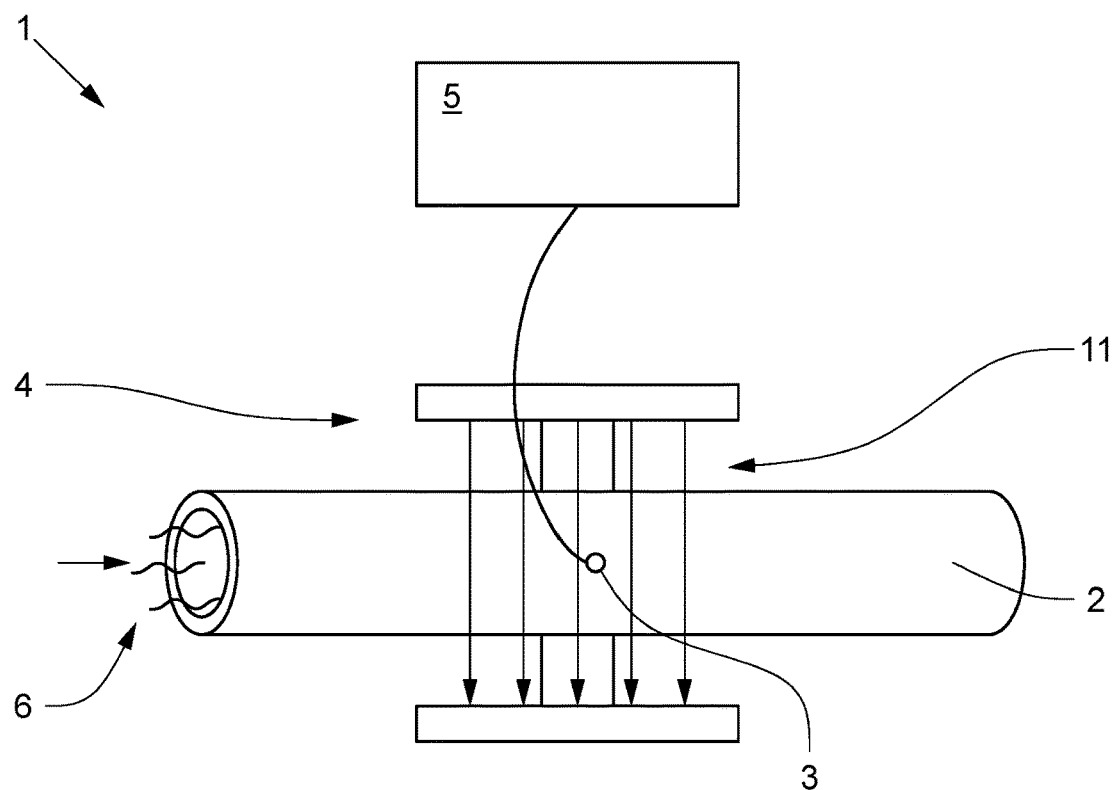
FIG. 1 illustrates an embodiment of a magnetic-inductive flowmeter in a side view.
Figure 2:
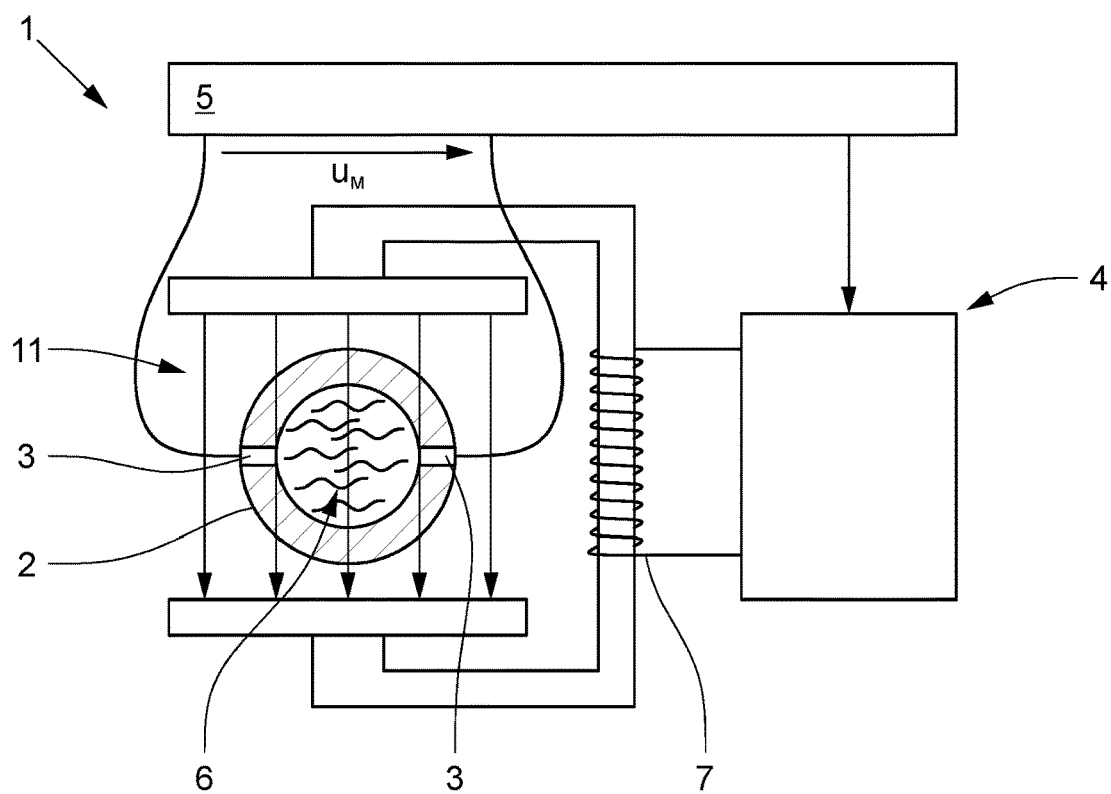
FIG. 2 shows the embodiment in a cut front view.

FIGS. 1 and 2 show, in different views, an abstracted representation of essential components of an embodiment of a magnetic-inductive flowmeter 1. FIG. 1 shows the magnetic-inductive flowmeter 1 in a side view and FIG. 2 in a cut front view. The magnetic-inductive flowmeter 1 has a measuring tube 2, two measuring electrodes 3, a magnetic field generator 4 and a controller 5. The magnetic-inductive flowmeter 1 is in operation, which is why a medium 6 is also flowing through the measuring tube 2.

Figure 3A:
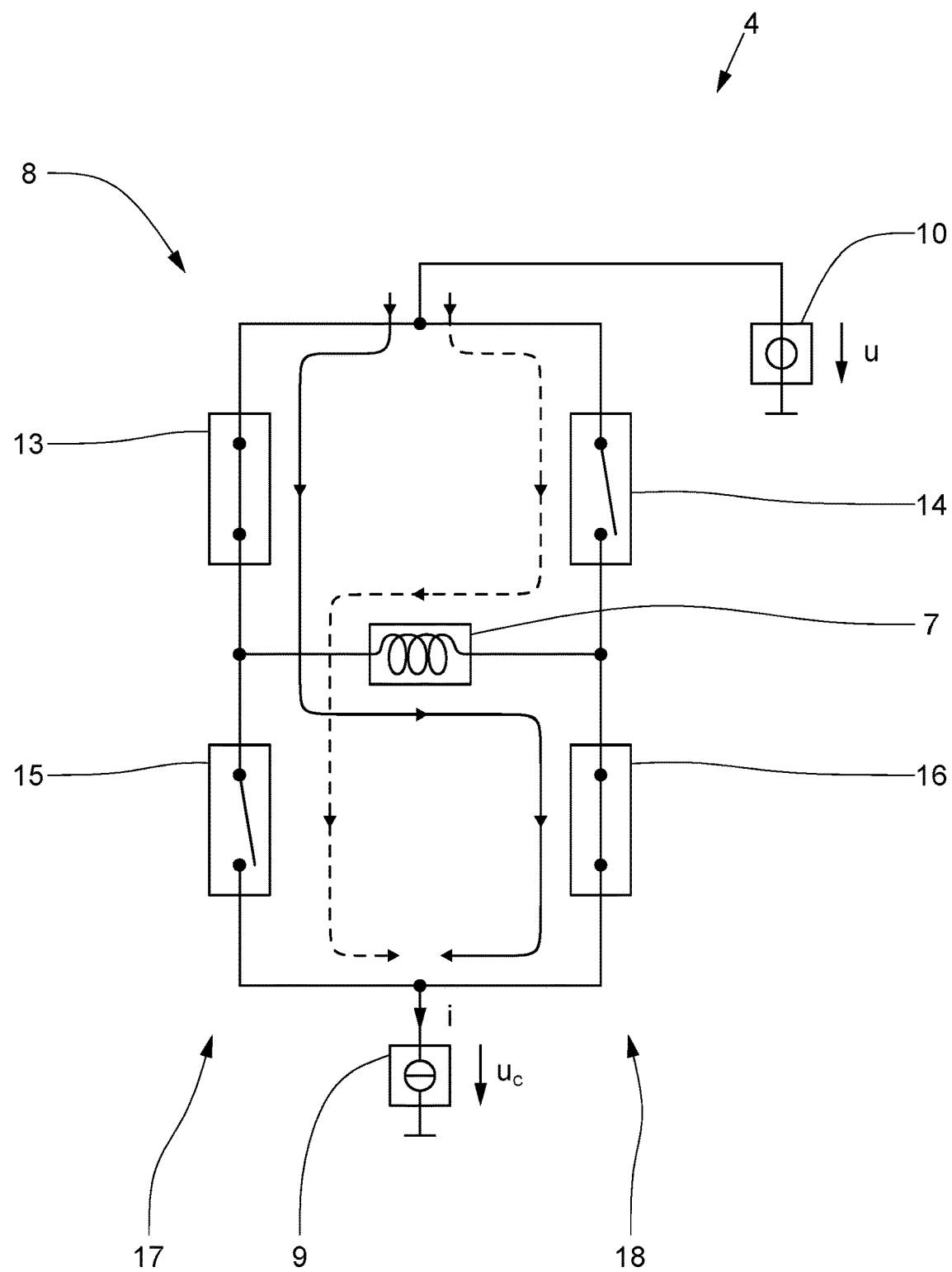
FIG. 3a illustrates a first embodiment of an abstracted circuit diagram of the magnetic field generator.

FIG. 3*a* shows a first embodiment of an abstracted circuit diagram with essential components of the magnetic field generator 4. If the magnetic field generator 4 is a stand-alone device and not part of another device, here it is part of the magnetic-inductive flowmeter 1, then it also has a controller. The controller of the stand-alone magnetic field generator is then designed like the controller 5 with respect to the magnetic field generator 4. The magnetic field generator 4 has a coil 7, a bridge circuit 8 with a current regulator 9 and a voltage controller 10. The magnetic field generator 4 is designed to generate a magnetic field 11 in the medium 6 flowing in the measuring tube 2 by means of the coil 7. For this purpose, in this embodiment, the magnetic field 11 is guided by a yoke 12. The magnetic field 11 induces a tappable measuring voltage $u_M$ into the flowing medium 6 at the measuring electrodes 3.

The bridge circuit 8 is designed to direct a current i through the coil 7 in one direction. For this purpose, it has a first switch 13, a second switch 14, a third switch 15 and a fourth switch 16. Further, the bridge circuit 8 has a first branch 17 and a second branch 18. The first switch 13 and the third switch 15 are located in the first branch 17, and the second switch 14 and the fourth switch 16 are located in the second branch 18. The direction can be provided to the bridge circuit 8 by the controller 5, in that the controller 5 is designed to control the switches 13 to 16. The direction is either a first direction or a second direction. The first direction is set in that the first switch 13 and the fourth switch 16 are closed and the second switch 14 and the third switch 15 are open. It is shown herein by a solid line with arrowheads. The second direction is set in that the first switch 13 and the fourth switch 16 are open and the second switch 14 and the third switch 15 are closed. It is shown here by a dashed line with arrowheads. FIG. 3 shows the first direction of current i. It is opposite to the second direction.

The current regulator 9 is designed to generate the current i according to a target current through the coil 7. The target current can be set in the current regulator by the controller 5. The current regulator 9 provides a current source for the coil 7.

The current regulator 9 operates either in a control mode or in a minimum mode. The current regulator 9 operates in a control mode when a current regulator voltage $u_C$ present across the current regulator 9 is greater than or equal to a control voltage value $U_{C,R}$ and operates in a minimum mode when the current regulator voltage $u_C$ is greater than a minimum voltage value $U_{C,M}$. In this case, the control voltage value $U_{C,R}$ is greater than the minimum voltage value $U_{C,M}$. In the minimum operation, an ability of the current regulator 9 to control the current i to a target current is limited with respect to the control operation.

The voltage regulator 10 is designed to generate a supply voltage u according to a target voltage across the bridge circuit 8. The target voltage can be set in the voltage regulator 10 by the controller 5. The voltage regulator 10 represents a voltage source and is electrically connected in parallel with the bridge circuit 8.

Figure 3B:
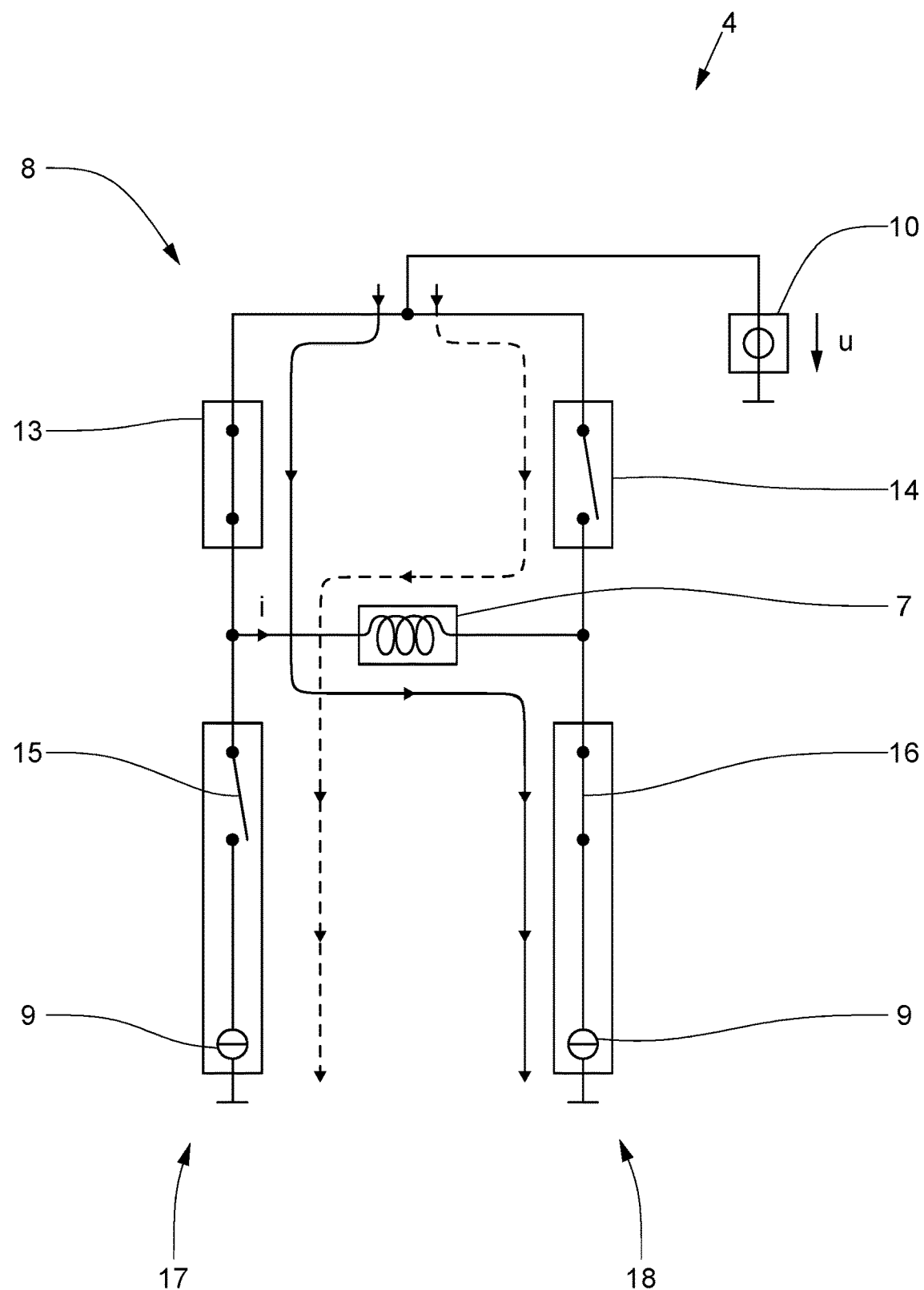
FIG. 3b illustrates a second embodiment of an abstracted circuit diagram of the magnetic field generator.

FIG. 3*b* shows a second embodiment of an abstracted circuit diagram with essential components of the magnetic field generator 4. The magnetic field generator 4 has a coil 7, a bridge circuit 8 and a voltage regulator 10. The bridge circuit 8 comprises a first switch 13, a second switch 14, a third switch and a fourth switch 16. Further, the bridge circuit 8 has a first branch 17 and a second branch 18. The first switch 13 and the third switch 15 are located in the first branch 17 and the second switch 14 and the fourth switch 16 are located in the second branch 18. Further, a current regulator 9 is located in the first branch 17 and a current regulator 9 is located in the second branch 18. The current regulator 9 in the first branch 17 is designed to be switchable by the controller 5 by means of the third switch 15 and the current regulator 9 in the second branch 18 is designed to be switchable by means of the fourth switch 16. In this sense, the current regulators 9 are switchable and shown as a unit with the respective switch 15 or 16. In an alternative design, the current regulator 9 itself in the first branch 17 is switchable on and off by the third switch 15 and the current regulator 9 itself in the second branch 18 is switchable on and off by the fourth switch 16.

The bridge circuit 8 is designed to direct a current i through the coil 7 in one direction. The direction can be set in the bridge circuit 8 by the controller 5, in that the controller 5 is designed to control the switches 13 to 16. The direction is either a first direction or a second direction. The first direction is set here in that the first switch 13 and the fourth switch 16 are closed and the second switch 14 and the third switch 15 are open. It is shown here by a solid line with arrowheads. The second direction is set in that the first switch 13 and the fourth switch 16 are open and the second switch 14 and the third switch are closed. It is shown here by a dashed line with arrowheads. FIG. 3*b* shows the first direction of current i. It is opposite to the second direction.

The current regulators 9 are designed to generate the current i according to a target current through the coil. The target current can be set in the current regulators 9 by the controller 5. The current regulators 9 each represent a current source for the coil 7.

Otherwise, the explanations for the first embodiment of an abstracted circuit diagram apply analogously to the second embodiment.

The controller 5 is designed to set the first direction, a target current value $I_S$ and a first target voltage value $U_{S,1}$ at a first reversal time $t_{U,1}$. In this case, the first target voltage value $U_{S,1}$ is greater than a second target voltage value $U_{S,2}$, and the second target voltage value $U_{S,2}$ causes the control voltage value $U_{C,R}$ of the current regulator voltage $u_C$ as the target voltage in an injected state of the magnetic field generator 4.

The controller 5 is further designed to measure a first measuring voltage value $u_{M,1}$ of the measuring voltage $u_M$ present between the measuring electrodes 3 after a first switching time $t_{S,1}$ and before a second reversal time $t_{U,2}$ and to determine a flow rate of the medium 6 through the measuring tube 2 using the first measuring voltage value $u_{M,1}$.

Further, the controller 5 is designed to determine the first switching time $t_{S,1}$ which is characterized in that it is after the first reversal time $t_{U,1}$, the current i between the first reversal time and the first switching time reaches the target current value $I_S$ and the current regulator voltage $u_C$ in the first switching time is larger than the minimum voltage value $U_{C,M}$ and smaller than the control voltage value $U_{C,M}$, and then to set the second target voltage value $U_{S,2}$ as the target voltage in the first switching time $t_{S,1}$.

Figure 4:
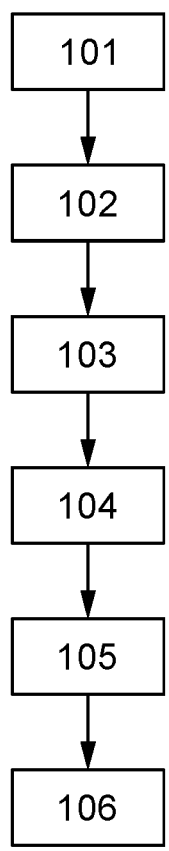
FIG. 4 illustrates an embodiment of the method of operating a magnetic-inductive flowmeter.

FIG. 4 shows a flowchart of an embodiment of a method for operating the magnetic-inductive flowmeter 1. The controller 5 is designed to perform this method and performs it since the magnetic-inductive flowmeter 1 is in operation.

Figure 5A:
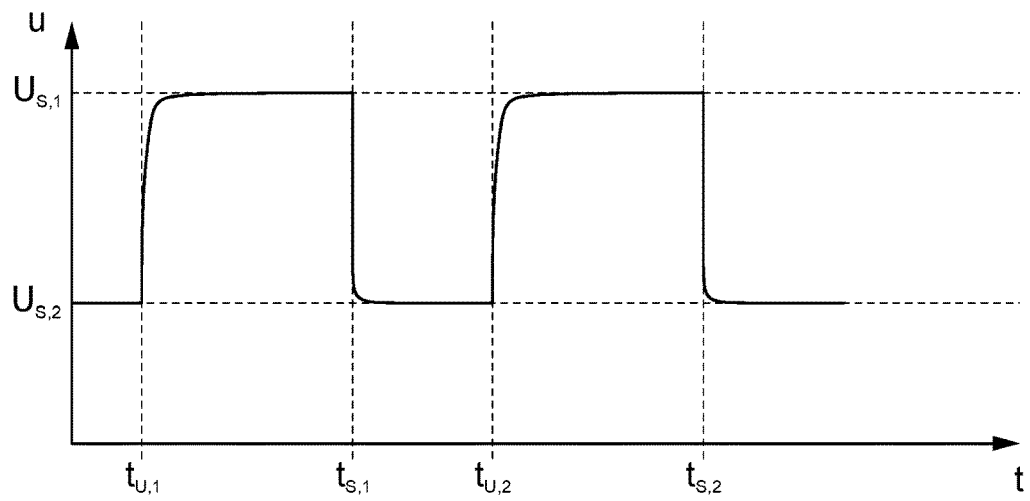
FIG. 5a illustrates a time course of a supply voltage during performance of the method.
Figure 5B:
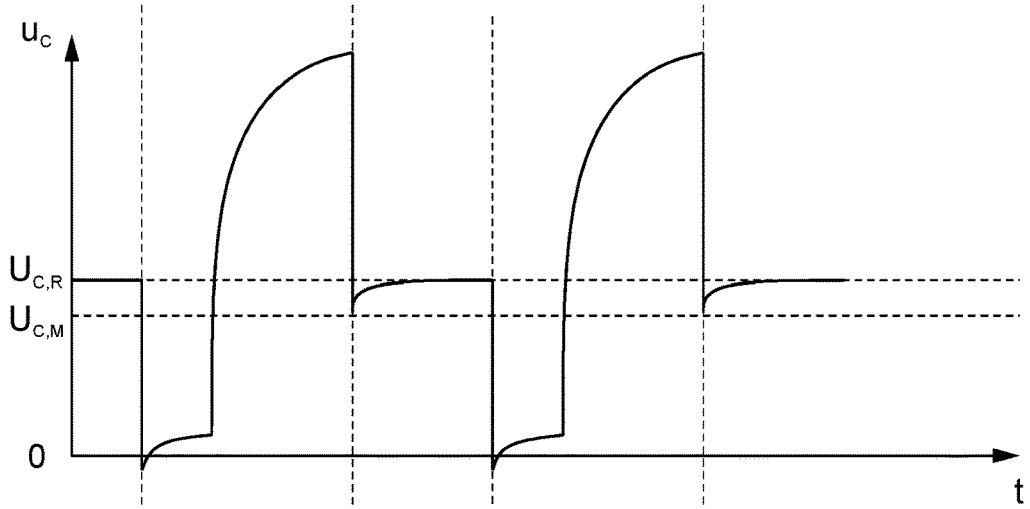
FIG. 5b illustrates a time course of a current regulator voltage during performance of the method.
Figure 5C:
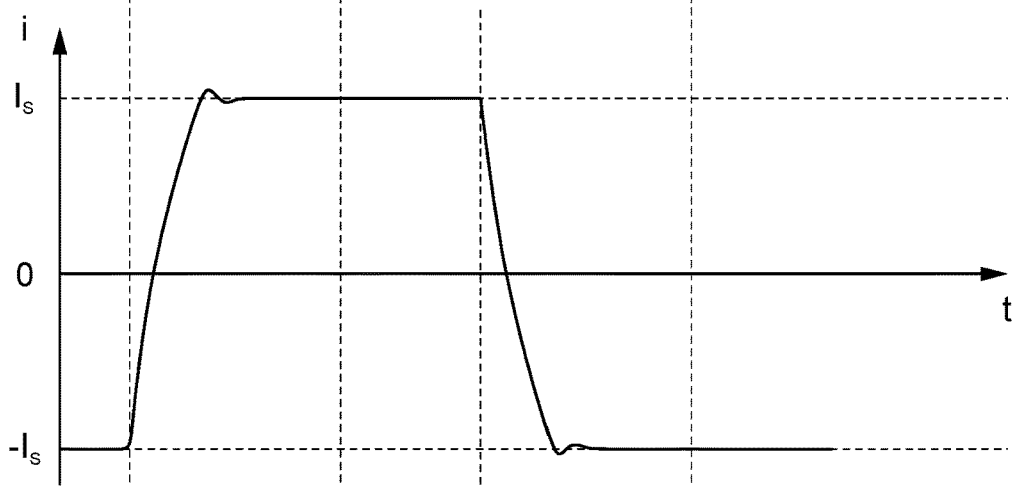
FIG. 5c illustrates a time course of a current when the method is performed.

FIG. 5 shows time courses of signals when the method is performed. Namely, FIG. 5a shows a time course of the supply voltage u, FIG. 5b shows a time course of the current regulator voltage $u_C$, and FIG. 5c shows a time course of the current i.

In a first method step 101, the first direction, the target current value $I_S$ and the first target voltage value $U_{S,1}$ are set at the first reversal time $t_{U,1}$. Previously, in this embodiment, the second set voltage value $U_{S,2}$ was set.

In a second method step 102, the first switching time $t_{S,1}$ is determined and the second target voltage value $U_{S,2}$ is set as the target voltage in this step.

In a third method step 103, the first measuring voltage value $u_{M,1}$ of the measuring voltage u M present between the measuring electrodes 3 is measured after the first switching time $t_{S,1}$ and before the second reversal time $t_{U,2}$, and a flow rate of the medium 6 through the measuring tube 2 is determined using the first measuring voltage value $u_{M,1}$.

In a fourth method step 104, the second direction and the first target voltage value $U_{S,1}$ are set as the target voltage at the second reversal time $t_{U,2}$.

In a fifth method step 105, a second switching time $t_{S,2}$ is determined, which is distinguished by the fact that the second switching time $t_{S,2}$ lies after the second reversal time $t_{U,2}$, the current i between the second reversal time $t_{U,2}$ and the second switching time $t_{S,2}$ reaches the target current value $I_S$ and the current regulator voltage $u_C$ at the second switching time $t_{S,2}$ is greater than the minimum voltage value $U_{C,M}$ and less than the control voltage value $U_{C,R}$, and the second target voltage value $U_{S,2}$ is set as the target voltage at the second switching time $t_{S,2}$.

In general, three conditions are fulfilled in a switching time $t_S$, i.e. in this embodiment in the first switching time $t_{S,1}$ and in the second switching time $t_{S,2}$. First, the switching time is after the immediately preceding reversal time $t_U$. In this embodiment, there is the first reversal time $t_{U,1}$ and the second reversal time $t_{U,2}$. Second, the current i reaches the target current value $I_S$ between the reversal time $t_U$ and the switching time $t_S$. Third, the current regulator voltage $u_C$ at the switching time $t_S$ is larger than the minimum voltage value $U_{C,M}$ and smaller than the control voltage value $U_{C,R}$. For the third condition, the effect of switching the target voltage from the first target voltage value $U_{S,1}$ to the second target voltage value $U_{S,2}$ on the current regulator voltage $u_C$ has already started to occur. Thus, an iterative method in which $t_S$ is varied until the three conditions occur is particularly suitable for determining the switching time $t_S$. The switching of the target voltage is thus causal for a drop in the current regulator voltage $u_C$, in particular to a value below $U_{C,M}$.

In a sixth method step 106, after the second switching time $t_{S,2}$ a second measuring voltage value $u_{M,2}$ of the measuring voltage u M present between the measuring electrodes 3 is measured and a flow rate of the medium 6 is determined using the first measuring voltage value $u_{M,1}$ and the second measuring voltage value $u_{M,2}$, wherein the second measuring voltage value $U_{M,2}$ in the medium 6 is also caused by the magnetic field 11 generated by the coil 7 in the flowing medium 6.

The invention claimed is:

1. A method for operating a magnetic field generator for a magnetic-inductive flowmeter, wherein the magnetic field generator includes a coil, a bridge circuit with at least one current regulator, a voltage regulator and a controller, wherein the bridge circuit is designed to direct a current through the coil in one direction, the direction being either a first direction or a second direction, and the bridge circuit can be set to the direction by the controller, wherein the current regulator is designed to generate the current according to a target current through the coil and the target current can be set in the current regulator by the controller, wherein for a control operation of the current regulator, a current regulator voltage present across the current regulator is greater than or equal to a control voltage value and for a minimum operation of the current regulator the current regulator voltage is greater than a minimum voltage value and the control voltage value is greater than the minimum voltage value, wherein the voltage regulator is designed to generate a supply voltage according to a target voltage across the bridge circuit and the target voltage can be set in the voltage regulator by the controller, the method comprising:

in a first method step performed by the controller, the first direction, a target current value as target current and a first target voltage value as target voltage are set at a first reversal time, wherein the first target voltage value is greater than a second target voltage value and the second target voltage value as target voltage effects the control voltage values of the current regulator voltage in a steady state of the magnetic field generator;

a second method step performed by the controller, a first switching time is determined, wherein the first switching time occurs after the first reversal time, the current between the first reversal time and the first switching time reaches the target current value, and the current regulator voltage at the first switching time is greater than the minimum voltage value and less than the control voltage value, and the second target voltage value is set as the target voltage at the first switching time; and in a third method step performed by the controller, after the first switching time and before a second reversal time, a first measuring voltage present between two measuring electrodes of the magnetic-inductive flowmeter is measured and a flow rate of a medium flowing through a measuring tube is determined using the first measuring voltage, wherein the first measuring voltage in the medium is caused by a magnetic field generated by the coil in the flowing medium.

2. The method according to claim 1, wherein the following method steps are performed following the third method step:

in a fourth method step performed by the controller, the second direction and the first target voltage value are set as target voltage at a second reversal time;

in a fifth method step performed by the controller, a second switching time is determined, wherein the second switching time occurs after the second reversal time, the current between the second reversal time and the second switching time reaches the target current value and the current regulator voltage at the second switching time is greater than the minimum voltage value and less than the control voltage value, and the second target voltage value is set as the target voltage at the second switching time.

3. The method according to claim 2, wherein the first method step, the second method step, the third method step, the fourth method step, and the fifth method step are performed at least twice in this order.

4. The method according to claim 1, wherein the following method steps are performed following the third method step:

in a fourth method step performed by the controller, the second direction and the first target voltage value are set as target voltage at the second reversal time;

in a fifth method step performed by the controller, a second switching time is determined, wherein the second switching time occurs after the second reversal time, the current between the second reversal time and the second switching time reaches the target current value and the current regulator voltage at the second switching time is greater than the minimum voltage value and less than the control voltage value, and the second target voltage value is set as the target voltage at the second switching time; and in a sixth method step performed by the controller, a second measuring voltage present between the measuring electrodes is measured after the second switching time, and a flow rate of the medium is determined using the first measuring voltage and the second measuring voltage, wherein the second measuring voltage in the medium is caused by a magnetic field generated by the coil in the flowing medium.

5. The method according to claim 4, wherein the first method step, the second method step, the third method step, the fourth method step, the fifth method step and the sixth method step are performed at least twice in this order.

6. The method according to claim 1, wherein the first switching time is determined iteratively by the controller, and a time interval between the first reversal time and the first switching time is reduced step by step until the current regulator voltage at the first switching time is greater than the minimum voltage value and less than the control voltage value.

7. The method according to claim 1, wherein the control voltage value is between 2.5 V and 3.5 V.

8. The method according to claim 1, wherein the minimum voltage value is between 1.5 V and 2.5 V.

9. A magnetic-inductive flowmeter, comprising:
a measuring tube;
two measuring electrodes;
a magnetic field generator; and
a controller;
wherein the magnetic field generator includes a coil, a bridge circuit with at least one current regulator and a voltage regulator and is designed to generate a magnetic field in a medium flowing in the measuring tube by means of the coil, which magnetic field induces a measuring voltage in the medium which can be tapped at the measuring electrodes;

wherein the bridge circuit is designed to direct a current through the coil in one direction, the direction being either a first direction or a second direction, and the bridge circuit can be set to the direction by the controller;

wherein the current regulator is designed to generate the current according to a target current through the coil and the target current can be set in the current regulator by the controller;

wherein, for a control operation of the current regulator, a current regulator voltage present across the current regulator is greater than or equal to a control voltage values and, for a minimum operation of the current regulator, the current regulator voltage is greater than a minimum voltage value and the control voltage value is greater than the minimum voltage value;

wherein the voltage regulator is designed to generate a supply voltage according to a target voltage across the bridge circuit, and the target voltage can be set in the voltage regulator by the controller;

wherein the controller is designed to set, at a first reversal time, the first direction, a target current value and a first target voltage value, wherein the first target voltage value is greater than a second target voltage value and the second target voltage value, as the target voltage, effects the control voltage value of the current regulator voltage in a steady state of the magnetic field generator; and wherein the controller is further designed to measure a first measuring voltage present between the measuring electrodes after a first switching time and before a second reversal time and to determine a flow rate of a medium through the measuring tube using the first measuring voltage;

wherein the controller is further designed to determine the first switching time, wherein the first switching time is after the first reversal time, the current between the first reversal time and the first switching time reaches the target current value and the current regulator voltage at the first switching time is greater than the minimum voltage value and less than the control voltage value, and at the first switching time the second target voltage value is then set as the target voltage.

* * * * *